(12) United States Patent
Lever

(10) Patent No.: US 7,717,553 B2
(45) Date of Patent: May 18, 2010

(54) SPECTACLES

(75) Inventor: Brian Lever, Pinner (GB)

(73) Assignee: Revel International Limited, Harrow, Middlesex (GB)

( * ) Notice: Subject to any disclaimer, the term of this patent is extended or adjusted under 35 U.S.C. 154(b) by 0 days.

(21) Appl. No.: 11/914,677

(22) PCT Filed: Nov. 2, 2005

(86) PCT No.: PCT/GB2005/004235

§ 371 (c)(1),
(2), (4) Date: May 20, 2008

(87) PCT Pub. No.: WO2006/123083

PCT Pub. Date: Nov. 23, 2006

(65) Prior Publication Data

US 2008/0266516 A1    Oct. 30, 2008

(30) Foreign Application Priority Data

May 19, 2005  (GB)  .................................. 0510258
Jun. 23, 2005  (GB)  .................................. 0512724

(51) Int. Cl.
G02C 3/00    (2006.01)
(52) U.S. Cl. ...................................................... 351/110
(58) Field of Classification Search ................ 351/110, 351/41, 136, 158, 124
See application file for complete search history.

(56) References Cited

U.S. PATENT DOCUMENTS 2,784,215 A    3/1957  Frederick
3,577,394 A    5/1971  Harrington
4,077,926 A    3/1978  Sanderson
4,496,685 A    1/1985  Nagasawa
5,646,706 A *  7/1997  Izumitani ..................... 351/110
7,086,733 B1 * 8/2006  Bac ............................. 351/110
7,249,844 B2 * 7/2007  Sakai ........................... 351/110

FOREIGN PATENT DOCUMENTS

| EP | 0718660 A | 6/1996 |
| EP | 1087250 A1 | 3/2001 |
| EP | 1531354 A | 5/2005 |
| FR | 2849510 A1 | 7/2004 |
| WO | WO 96/18127 A1 | 6/1996 |

OTHER PUBLICATIONS

European Search Report for GB 0512724.6, dated Sep. 1, 2005, 3 pages.

\* cited by examiner

*Primary Examiner*—Hung X Dang
(74) *Attorney, Agent, or Firm*—Vedder Price P.C.

(57) ABSTRACT

Spectacles comprising spectacle mounts (a bridge piece (15) and two side pieces (29)) affixed to two lenses (2), the spectacle mounts being affixed by means of pins (25, 31) which are inserted into appropriately positioned holes or slots (28) drilled into the lenses (2). A single hole or slot (28) in the lens (2) is required to allow the attachment of each mount (15, 29) by location with the appropriate pin (25, 31). The holes or slots (28) are sized to match the dimensions of the pin to give the pins (25, 31) a "close" fit, and the adhesive is specifically chosen to act as a buffer between the pins (25, 31) and the lens (2), thereby substantially reducing or even eliminating the pressure around the assembly point which produces stress marks in rimless spectacles constructed using known methods.

44 Claims, 3 Drawing Sheets

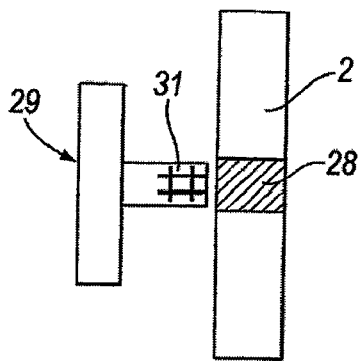
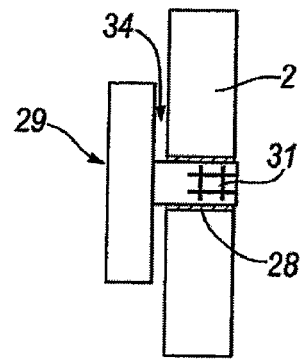
Fig.7A        Fig.7B
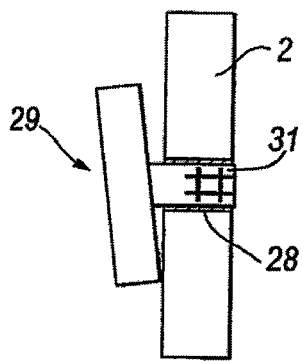
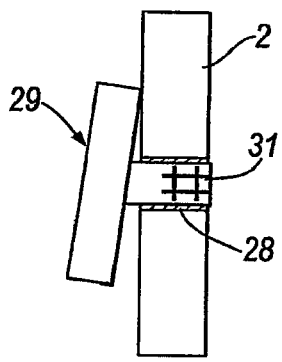
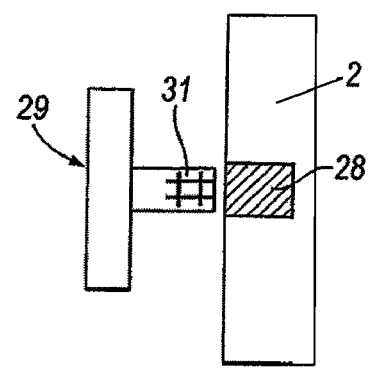
Fig.7C        Fig.7D        Fig.7E
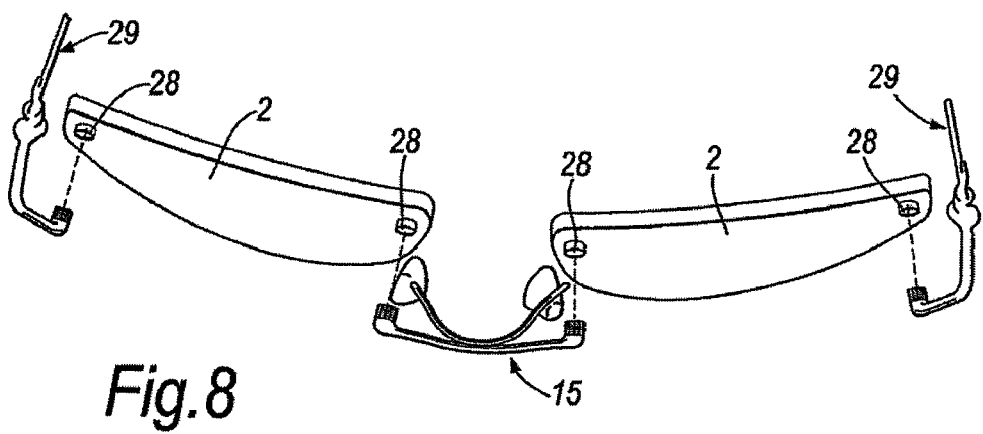
Fig.8

SPECTACLES

RELATED APPLICATIONS

This application is a U.S. national phase of International Patent Application No. PCT/GB2005/004235, filed Nov. 2, 2005, which claims priority to GB 0512724.6, filed Jun. 23, 2005, and GB 0510258.7, filed May 19, 2005.

The present invention relates to spectacles and to a method for the assembly of spectacles.

The following is a more detailed description of a known pair of spectacles with reference being made to the accompanying FIG. 1, which shows the pair of spectacles 1 including two rims 3, and two lenses 2. Each lens 2 is surrounded by a respective rim 3, but this may not necessarily be the case and each rim 3 may only partially surround the associated lens 2, depending on the style of the spectacles. The spectacles 1 further comprise spectacle mounts which allow the spectacles 1 to fit a wearer's face. The spectacle mounts shown in FIG. 1 comprise a bridge piece 4 which is connected between the rims 3, which is shaped to fit above the bridge of a wearer's nose and which carries pads 16 that support the spectacles on the wearer's nose, and two opposing side pieces 5 each of which extend from a respective outer side of each associated rim 3. Each of the side pieces 5 comprise a lug 6 and a temple piece 7 shaped or shapeable to a wearer's ear. The temple piece 7 may be joined to the lug 6 by a hinge 8 (as is shown in FIG. 1) or may be moulded together with the lug 6 to form a single piece depending on the style of the spectacles 1.

Rimless spectacles, in which the rims are omitted and in which the spectacle mounts (i.e., in FIG. 1, the bridge piece and the two lugs) are connected directly to the lenses, have increased in popularity as they are very lightweight, as they allow the lenses to be cut to any required shape, and as they are relatively inconspicuous in comparison to spectacles including rims.

Rimless spectacles are constructed by attaching the bridge piece to a nasal side of each lens and attaching each side piece to a temporal side of a respective lens.

There are several known methods of attaching the bridge piece and side pieces to a lens. In the case where spectacle mounts are made of wire, the most common method involves drilling, for each end of the bridge piece and side pieces, a respective hole through the lens at the appropriate position and cutting a slot extending inwardly of the edge of the lens, close to the hole. In this case, the ends of the spectacle mounts (i.e. the bridge piece and side pieces), where they are to be attached to the lens, are looped around a screw that is inserted through the associated hole and then bent around the edge of the lens to fit with the slot, thereby limiting the movement of the wire with respect to the lens.

Another known method used with spectacle mounts that are formed from metal strip is described with reference to FIG. 2, which shows a partial view from above of spectacles showing the attachment of spectacle mounts to lenses 2.

In this method, a screw 10 is attached to each end of the bridge piece 9 and the end of each side piece (not shown) at which the side piece is attached to the associated lens 2. For each spectacle mount, the screw 10 is pushed through an associated hole which is drilled into the lens 2 at the required attachment point. If the spectacle mounts are made of wire, the arrangement is adapted by turning the wire end of each spectacle mount around the screw 10 that is inserted through the hole from the front of the lens. A plastic washer 11 is then inserted to the rear of the lens 2, followed by a thin metal washer 12, a lock nut 13, and finally a cap nut (or dome headed nut) 14 to lock the screw 10 into place.

These spectacle mounts can also be shaped to fit to the rear of the lenses, in which case the washers and nuts are arranged as necessary to reduce and spread the pressure on the lenses.

Other known methods for use with rimless spectacles include mounting each of these spectacle mounts by the use of two drilled holes in the lens at the required attachment point and then securing the spectacle mount to the lens with two screws and associated nuts each side of the lens. A lug may be attached to a lens by cutting a slot at a side of the lens into which the attachment end of the lug is inserted, the attachment end of the lug having been bent to stay in place without the use of screws.

Other methods can be used to attach such spectacle mounts to a lens in rimless spectacles—such as by the use of pins attached to such a spectacle mount which can be inserted into either the front or edge of the lens, or a combination of pins and plastic inserts which are forced together with pliers to hold the pins in place.

The assembly of rimless spectacles that contain fixing parts such as screws, pins, nuts or plastic inserts may be problematic for those assembling spectacles for use, as opticians often throw away these fixing parts when putting spectacles on display so that when such spectacles are sent to be assembled for use there is extra cost and unnecessary delay in the assembly process if these parts have to be purchased separately. Further, the fixing parts may also become loose or otherwise move out of alignment, the fixing parts may obscure a wearer's area of vision, and the fixing parts may cause an obstruction when the lenses are cleaned. The fixing parts also tend to put pressure on the lens which can crack or distort the lens around the assembly point. It is often not possible to adjust rimless spectacles which are produced by the methods described above for pantoscopic tilt (i.e. the tilt of the lenses about a horizontal axis when the spectacles are worn) and the head width of a wearer, and they require a skilled technician to assemble, thereby tying up skilled staff on what is a very slow job.

In addition to the known methods described above for attaching the spectacle mounts described above with reference to FIG. 1 to the lenses in rimless spectacles using mechanical fixing means, it is known to attach such spectacle mounts using adhesive. A slot or hole may be cut into the lens at the appropriate location and, where the spectacle mounts are made of wire, the wire of the mount to be attached is bent to engage with the hole. The wire is then fixed into place in the hole using adhesive. The hole in the lens is of a size so as to create a "tight" fit (an interference fit) for the wire, and consequently mounts affixed using this method are known to put great pressure on the lens, causing the appearance of stress marks on soft lenses such as high index, photochromatic and polycarbonate lenses. Further, adhesives used to affix the mounts using this method have their own associated drawbacks. One known system uses a two component adhesive which attacks polycarbonate and may lead to cracking of polycarbonate lenses, while another known system uses an adhesive which cures in the presence of ultraviolet light which is messy and time consuming to both assemble and clean.

According to the invention, there is provided a spectacle assembly comprising two lenses and at least one spectacle mount, at least one of the said mounts including a fixing part sized to fit into a hole formed in a lens to connect the mount to the lens, the part being held in the associated hole by an adhesive having a volume prior to setting that is substantially the same as the volume thereof when set, the fit and the adhesive being such that the mount is fixed to the lens.

According to the invention, there is also provided a method of fixing a lens to a spectacle mount, the mount including a fixing part sized to fit into a hole formed in a lens to connect the mount to the lens, the method including holding the part in the associated hole by means of an adhesive having a volume prior to setting that is substantially the same as the volume thereof when set, the fit and the adhesive being such that the mount is fixed to the lens.

According to the invention, there is further provided an adhesive used for fixing a lens to a spectacle mount, the mount including a fixing part sized to fit into a hole formed in a lens to connect the mount to the lens, the part being held in the associated hole by the adhesive which has a volume prior to setting that is substantially the same as the volume thereof when set.

According to the invention, there is still further provided the use of an adhesive for the assembly of spectacles, the adhesive having a volume prior to setting that is substantially the same as the volume thereof when set.

According to the invention, there is yet further provided a spectacle assembly comprising two lenses and at least one spectacle mount, at least one of the said mounts including a fixing part attached to an associated lens to connect the mount to the lens, a plastically deformable portion being provided adjacent said fixing part to allow adjustment of the remainder of the mount relative to the associated fixing part, and hence the lens.

Some embodiments of the invention will now be described in detail, by way of example, with reference to the accompanying drawings in which:

FIGS. 7A, 7B, 7C and 7D are partial views of an end of the side piece of FIGS. 5 and 6 and of the associated lens showing successive stages in the attachment of the side piece to the lens;

FIG. 7E shows an alternative arrangement to FIG. 7A; and

FIG. 8 is a view from above the spectacles showing the bridge piece of FIGS. 3 and 4 and the side piece of FIGS. 5 and 6 positioned for connection to the lenses.

In the drawings, like elements are generally designated with the same reference numeral.

Figure 1:
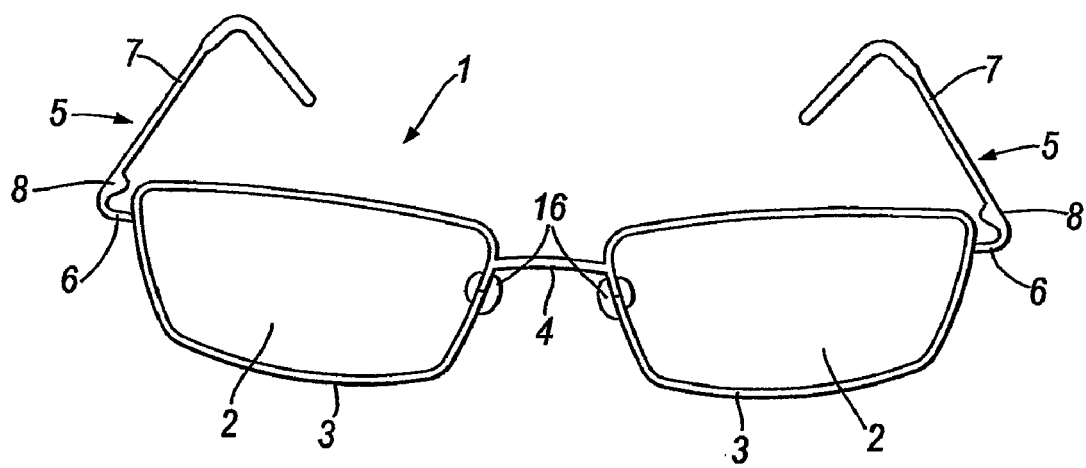
FIG. 1 shows a pair of rimmed spectacles.
Figure 2:
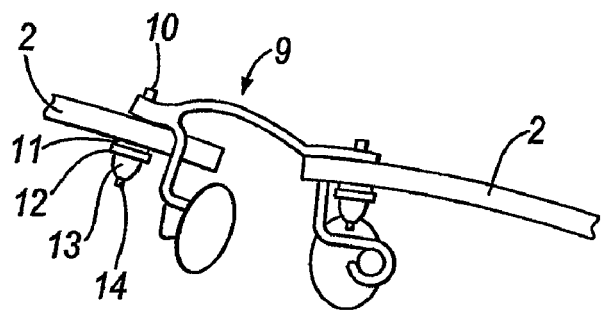
FIG. 2 shows a partial view from above of spectacles with attachment of spectacle mounts to the lenses.
Figure 3:
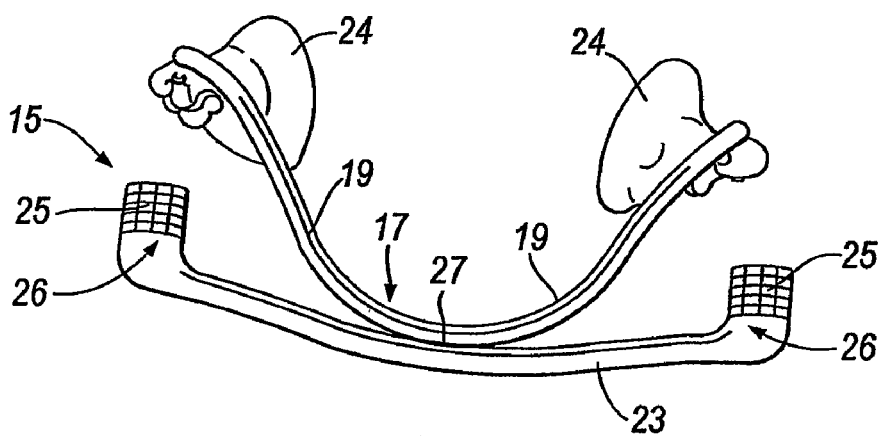
FIG. 3 shows a bridge piece for use in the assembly of rimless spectacles.

Referring first to FIG. 3, the bridge piece 15 comprises a bridge 23 for connection to the lenses and arms 19 extending from the bridge 23 and each carrying a respective pad 24 at an end remote from the bridge 23. Each end of the bridge 23 carries an associated pin 25. The bridge piece 15 may be formed from metal as a single piece, or may be formed by separate parts and then joined together at 17, for example by soldering or welding 27.

The pins 25 are formed by blocks of rectangular cross-section which project from the bridge piece 15. The pins 25 include opposed longer surfaces interconnected by shorter surfaces, the longer surfaces in the plane generally parallel to the length of the bridge 23. The pins 25 are approximately 1.25 mm deep and 2.45 mm wide. Each longer surface is grooved to provide a gripping formation, with the grooved part of each surface extending approximately 2.40 mm from the distal end. Of course, pins 25 with any suitable dimensions could be used and, although the pins 25 shown in FIG. 3 would be oriented horizontally when spectacles are placed on a wearer's face, they could be oriented vertically to suit the particular style of spectacle. The grooved longer surfaces of the pins 25 comprise a cross-hatched pattern for a purpose to be described below. Each pin 25 has a plastically deformable neck 26 for a purpose to be described below.

Figure 4:
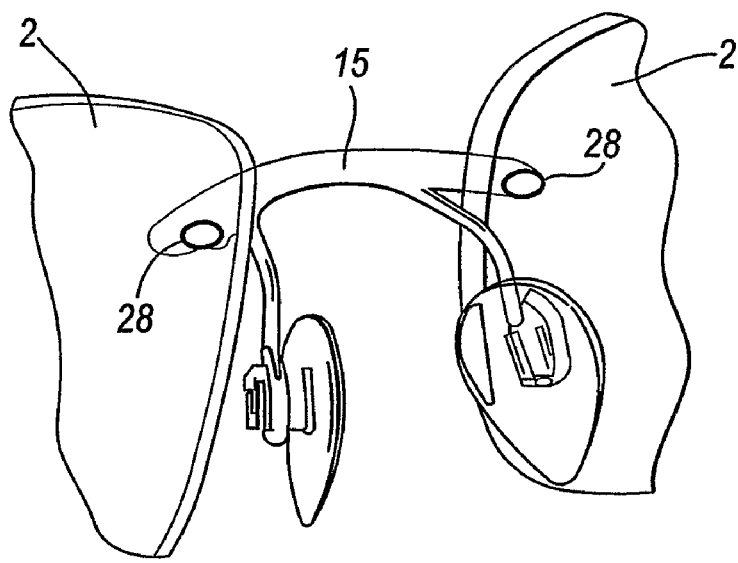
FIG. 4 shows the bridge piece of FIG. 3 when attached to lenses.

The bridge piece 15 is connected to a pair of lenses 2 as follows, with reference to FIG. 4. First, each lens 2 is formed with a hole at the nasal side of the lens 2 at the position where it is required to attach the associated end of the bridge piece 15. Only a single hole 28 is required in each lens 2, to allow the attachment of the bridge piece 15 to the lens 2. The requirement of a single hole in the lens 2 is the same for the attachment of a side piece to the lens 2 as will be described below. The holes 28 are formed to have a cross-section that is the same as the cross-section of the pins 25 to give a "close" fit where force is not required to insert a pin 25 into the associated hole 28, rather than a "tight" fit (or interference fit) which is used in the known methods of spectacle assembly described above and in which force is applied to insert a pin 25 into the associated hole 28. The fit should be such as to allow a minimum sufficient amount of adhesive required to fix the bridge piece 15 to the lens 2, to be used.

The pins 25 are inserted into appropriately positioned holes 28 formed in the lenses 2 and secured by adhesive. The close fitting of a pin 25 in the associated hole 28 is an important aspect of the embodiment described, as the adhesive used to fix the bridge piece 15 to the associated lens 2 is specifically chosen to retain its volume when set, i.e. it will not shrink or expand upon setting, thereby enabling the adhesive to act as a buffer between the pin 25 and the lens 2. The adhesive buffer acts to substantially reduce or even eliminate the pressure around the assembly point, which produces the stress marks that are normally visible on rimless spectacles made with soft lenses. The buffering effect of the adhesive also enables the assembly of rimless spectacles using lens materials that are not currently considered to be suitable for rimless spectacles. For example, CR39 (hard resin) lenses are not usually used in rimless spectacles because of the brittle nature of the lens material, and lenses with a very high index, such as 1.74 index, higher index and polycarbonate lenses, are often not suitable for rimless spectacles because of the considerable stress marks produced by assembly using known methods. Further, to avoid the problems related to the known methods of spectacle assembly which use adhesives, the adhesive used should be a single component adhesive which does not require the presence of ultraviolet light for curing and which does not attack polycarbonate.

A suitable adhesive which offers all of the above properties has been found to be a cyanoacrylate adhesive comprising an acetate group with a large molecule size. Cyanoacrylate adhesives are based on a wide range of different acetate groups with a range of molecule sizes and, in general, smaller molecule acetates produce adhesives with a greater overall strength and setting time. Polymerisation occurs under the influence of trace moisture contained in the atmosphere and, in the case of spectacle assembly, within the lenses, and this polymerisation sets the adhesive by neutralising the acidic stabiliser present in the unset adhesive. The presence of a large-molecule acetate group gives the cyanoacrylate adhesive the property of retaining its volume when set, thereby making such an adhesive particularly suitable for application in the assembly of rimless spectacles using the method described above. It has been found that an oxygen-containing acetate group, such as an alkoxyalkyl, in the cyanoacrylate adhesive has a suitable molecule size to give the adhesive the required volume-retaining property when set, without compromising the advantages attributed to small molecule sized cyanoacrylate adhesives.

Particularly suitable adhesives for this application are Sicomet (RTM) 9010 and 9020, manufactured by Henkel Adhesives, which have a chemical basis of methoxyethyl cyanoacrylate.

To assemble the spectacles, a very small amount of adhesive should be applied into the grooves of each of the longer surfaces of the pin 25 so that the adhesive sits slightly proud to the longer surfaces of the pin 25. An applicator such as a tooth pick or cocktail stick may be used to apply the adhesive so that it can be applied sparingly. The pins 25 are then inserted into place in the associated hole 28 in the lens 2. When a pin 25 is inserted into the associated hole 28, the adhesive will spread over the pin 25 and fill the space between the pin 25 and the lens 2. If any adhesive spreads onto the surface of the lens 2 it should be cleaned off using an appropriate solvent, applied using an optical wipe. Each pin 25 should be cleaned as required after the next pin 25 has been inserted into the associated hole 28, as the adhesive starts to set almost immediately.

The side pieces of the spectacles, to be described below, are fixed to the lenses in a similar fashion.

The adhesive should be left to set for about ten minutes, at which point the spectacles can be adjusted, if this is necessary. The spectacles can be adjusted for pantoscopic tilt, side angle and temple width as described below, using the appropriate tool such as nylon nose pliers. The spectacles can also be adjusted for any small drilling error as the spectacle mounts do not contain any mechanical fixing components which are easily broken. The deformable necks 26 allow the bridge piece 15 to be adjusted relative to the lenses 2 to allow the spectacles to be fitted correctly to a wearer.

Figure 5:
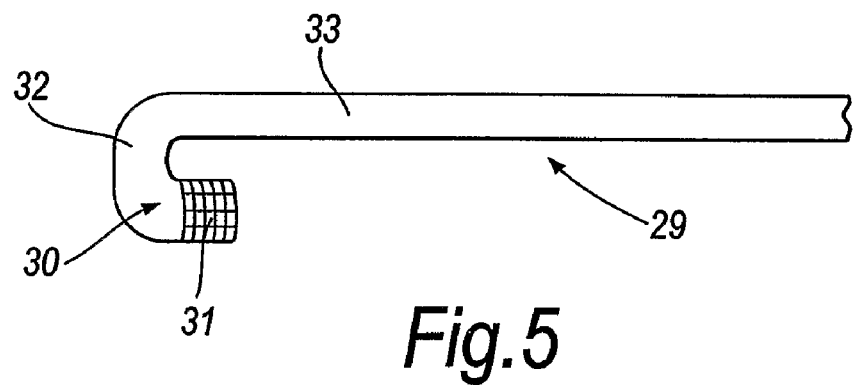
FIG. 5 shows one end of a side piece for the rimless spectacles of FIGS. 3 and 4.
Figure 6:
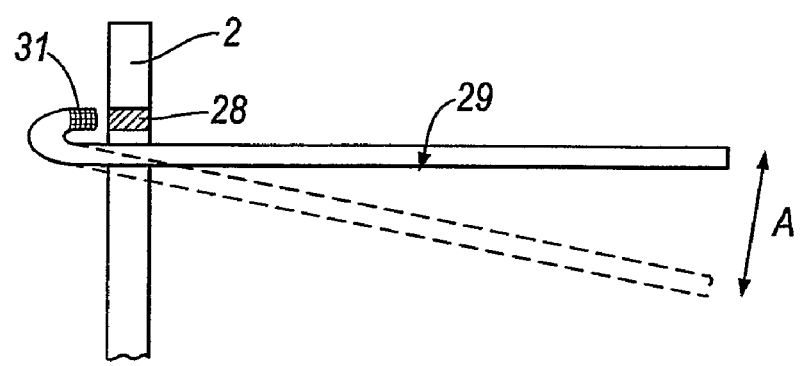
FIG. 6 shows the side piece of FIG. 5 attached to a lens and shows how the angle of the side piece with respect to the lens can be adjusted to any required position.

The side piece 29 shown in FIGS. 5 and 6 comprises a pin 31 for attaching the side piece 29 to the lens 2, a lug 32 and a temple piece 33. The pin 31 is formed by a block of rectangular cross-section which projects from the side piece 29. The pin 31 includes opposed longer surfaces interconnected by shorter surfaces, the longer surfaces in the plane generally parallel to the length of the side piece 29. The pin 31 is approximately 1.25 mm deep and 2.45 mm wide. Each longer surface is grooved to provide a gripping formation, with the grooved part of each surface extending approximately 2.40 mm from the distal end. Of course, a pin 31 with any suitable dimensions could be used and, although the pin 31 shown in FIG. 5 would be oriented horizontally when spectacles are placed on a wearer's face, it could be oriented vertically to suit the particular style of spectacle. The grooved longer surfaces of the pin 31 comprise a cross-hatched pattern. The pin 31 is connected to the remainder of the side piece 29 by a plastically deformable neck 30, allowing the angle of the side piece 29 to be varied with respect to the lens 2 as is shown in FIG. 6 by the arrow A.

The connection of a side piece 29 to a lens 2 will now be described with reference to FIGS. 7A to 7D. First, a hole 28 is formed in the lens 2 as described above for the bridge piece 15 with reference to FIG. 4. A small amount of adhesive of any of the kinds described above with reference to FIG. 4 is placed on the grooved longer surfaces of the pin 31 prior to the insertion of the pin 31 into the hole 28 in the lens 2, thereby securely attaching the side piece 29 to the lens 2. Preferably, and as shown in FIG. 7B, a small gap 34 (typically 1 mm to 2 mm) is left between the side piece 29 and the face of the lens 2 in which the plastically deformable neck 30 is located to allow the pantoscopic tilt of the spectacles to be adjusted—as is shown in FIGS. 7C and 7D. A greater pantoscopic tilt can be achieved if a larger gap 34 is left between the side piece 29 and the lens 2, and the spectacles can be assembled as required for each individual wearer. The gap between the side piece 29 and the lens 2 also allows the temple width of the spectacles to be adjusted—and again the spectacles can be assembled with the gap 34 between the side piece 29 and the lens 2 suitable for allowing the plastically deformable neck 30 to provide the spectacles with a temple width as required by an individual wearer.

The side piece 29 may be formed from metal as a single piece, or the pin 31, the lug 32 and the temple piece 33 may be formed separately and then joined together, for example by soldering or welding. Depending on the style of the spectacles, the lug 32 and the temple piece 33 may be formed separately and then joined together with a hinge. The pin 31 and the lug 32 may be formed from metal as a single piece, or may be formed separately and then joined together, for example by soldering or welding.

The components of the spectacle mounts described above with reference to FIGS. 3 to 8 may be made from any suitable material, such as plastic or those metals which are commonly used for making spectacles and which are capable of being moulded. Examples of suitable metals are titanium, stainless steel, Monel (RTM) (a nickel-containing alloy), aluminium, EVO (RTM) (nickel-free steel), Breda (RTM) (a nickel-free alloy), nickel silver and memory metals (i.e. alloys with the ability to remember their shape).

Since the pin 31 of the side piece 29 has the same dimensions as the pin 25 of the bridge piece 15, this enables a single hole dimension setting of 1.25 mm×2.45 mm to be inputted into the database of a drill used to drill the holes into the lenses for the assembly of the spectacles. Only minor adjustments will have to be made to the drilled holes as the pins are produced to be accurate to within 0.03 mm.

The pins 25, 31 are suitable for use with lenses 2 with a standard lens thickness of 2.0 mm to 2.2 mm. For a thicker lens a blind hole, as shown in FIG. 7E, can be drilled from the front of the lens 2, meaning that there will be no hole on the surface of the lens 2 which is closest to the face of a wearer. This means that wrap-around type rimless sunglasses can be assembled with thick lenses using the described method. Such sunglasses may also be adjusted for pantoscopic tilt and head width, which is not usually possible with standard wrap-around type sunglasses.

As can clearly be seen from FIG. 8, only a single hole 28 in the lens 2 is required to allow the fixing of each spectacle mount 15, 29 by location with the appropriate pin 25, 31. Each of the spectacle mounts 15, 29 is fixed to the appropriate lens 2 by means of a single horizontal hole, or slot, 28, rather than by the methods known in the art in which two pins are located with two separate holes. The spectacle mounts 15, 29 can be produced with vertical pins if required to suit the style of spectacle.

The spectacle mounts described above with reference to FIGS. 3 to 8 are formed by a bridge piece and side pieces. Other spectacle mounts, and in particular hook arrangements which allow clip-on sunglasses to be attached to spectacles, may be assembled in the same way.

The spectacle mounts may also include delicate decorative parts, such as diamantes, as the spectacle mounts are fixed to the lenses by hand and no pressure is required to be applied to the spectacle mounts during the assembly of the spectacles.

The simple method described above for assembling rimless spectacles removes the need for skilled technicians to construct the spectacles, and also reduces the time taken to assemble the spectacles by a factor of four or five when compared to the known methods described above. This leads to an increase in the production volume and a decrease in the production cost of the spectacles.

The invention claimed is:

1. A spectacle assembly comprising two lenses, each having a single nasal-side spectacle mount and a single temple-side spectacle mount, each of said mounts including a single linear fixing part sized to fit into a single linear hole formed in the associated lens to connect the mount to the lens, which hole extends in the direction of the thickness of the lens, the fixing part being held in the associated hole by an adhesive having a volume prior to setting that is substantially the same as the volume thereof when set, the fit and the adhesive being such that the mount is fixed to the lens, wherein the adhesive acts as a buffer between each of said fixing parts and the associated lens to substantially reduce or eliminate pressure around the assembly point of the fixing part and the lens.

2. The assembly of claim 1, wherein the hole has a cross-section that is the same as the cross-section of the fixing part.

3. The assembly of claim 1, wherein the adhesive is a single component adhesive.

4. The assembly of claim 1, wherein the adhesive is a cyanoacrylate based adhesive comprising an acetate group which contains at least one oxygen molecule.

5. The assembly of claim 4, wherein the acetate group is an alkoxyalkyl group.

6. The assembly of claim 5, wherein the alkoxyalkyl group is specifically a methoxyethyl group.

7. The assembly of claim 1, wherein the fixing part comprises a member projecting from the associated mount and received in the hole.

8. The assembly of claim 7, wherein the member is a block of generally rectangular cross-section.

9. The assembly of claim 8, wherein the block is provided with gripping formations.

10. The assembly of claim 9, wherein the gripping formations comprise cross-hatching.

11. The assembly of claim 10, wherein the block has longer surfaces interconnected with shorter surfaces, the cross-hatching being provided on the longer surfaces.

12. The assembly of claim 7, wherein the member is connected to the remainder of the mount by a neck that is plastically deformable to allow the associated mount to vary the orientation hereof relative to the associated lens.

13. The assembly of claim 1, wherein the hole is a through hole.

14. The assembly of claim 1, wherein the hole is a blind hole.

15. The assembly of claim 1, wherein the mount is a side piece, the fixing part being provided at an end of the side piece.

16. The assembly of claim 15, wherein the fixing part and the side piece are formed together.

17. The assembly of claim 15, wherein the fixing part is formed separately from, and then joined to, the side piece.

18. The assembly of claim 1, wherein the mount is the bridge piece, the fixing part being formed towards an end of the bridge piece.

19. The assembly of claim 18, wherein the bridge piece carries two such fixing parts, each being located at a respective end of the bridge piece.

20. A method of fixing a lens to a spectacle mounting arrangement comprising a single nasal-side spectacle mount and a single temple-side spectacle mount, each of the mounts including a single linear fixing part sized to fit into a single linear hole formed in the associated lens in the direction of the thickness of the lens to connect the mount to the lens, the method including holding the fixing part in the associated hole by means of an adhesive having a volume prior to setting that is substantially the same as the volume thereof when set, the fit and the adhesive being such that the mount is fixed to the lens, wherein the adhesive acts as a buffer between each of said fixing parts and the associated lens to substantially reduce or eliminate pressure around the assembly point of the fixing part and the lens.

21. The method of claim 20, wherein the hole has a cross-section that is the same as the cross-section of the fixing part.

22. The method of claim 20, wherein the adhesive is a single component adhesive.

23. The method of claim 20, wherein the adhesive is a cyanoacrylate based adhesive comprising an acetate group which contains at least one oxygen molecule.

24. The method of claim 20, wherein the acetate group is an alkoxyalkyl group.

25. The method of claim 20, wherein the alkoxyalkyl group is specifically a methoxyethyl group.

26. The method of claim 20, wherein the fixing part comprises a member projecting from the associated mount and received in the hole.

27. The method of claim 26, wherein the member is a block of generally rectangular cross-section.

28. The method of claim 27, wherein the block is provided with gripping formations.

29. The method of claim 28, wherein the gripping formations comprise cross-hatching.

30. The method of claim 29, wherein the block has longer surfaces interconnected with shorter surfaces, the cross-hatching being provided on the longer surfaces.

31. The method of claim 20, wherein the member is connected to the remainder of the mount by a neck that is plastically deformable to allow the associated mount to vary the orientation thereof relative to the associated lens.

32. The method of claim 20, wherein the hole is a through hole.

33. The method of claim 20, wherein the hole as a blind hole.

34. The method of claim 20, wherein the mount is a side piece, the fixing part being provided at an end of the side piece.

35. The method of claim 34, wherein the fixing part and the side piece are formed together.

36. The method of claim 34, wherein the fixing part is formed separately from, and then joined to, the remainder of the side piece.

37. The method of claim 20, wherein the mount is the bridge piece, the fixing part being formed towards an end of the bridge piece.

38. The method of claim 37, wherein the bridge piece carries two such fixing parts, each being located at a respective end of the bridge piece.

39. An adhesive used for fixing a lens to a spectacle mount, the mount including a fixing part sized to fit into a hole formed in a lens to connect the mount to the lens, the part being which hole extends in the direction of the thickness of the lens held in the associated hole by the adhesive which has a volume prior to setting that is substantially the same as the volume thereof when set, wherein the adhesive acts as a buffer between the fixing part and the hole to substantially reduce or eliminate pressure around the assembly point of the fixing part and the lens.

40. The adhesive of claim 39 being a single component adhesive.

41. The adhesive of claim 39 being a cyanoacrylate based adhesive comprising an acetate group which contains at least one oxygen molecule.

42. The adhesive of claim 39, wherein the acetate group is an alkoxyalkyl group.

43. The adhesive of claim 39, wherein the alkoxyalkyl group is specifically a methoxyethyl group.

44. A spectacle assembly comprising two lenses and at least one spectacle mount, at least one of said mounts including:

a fixing part sized to fit into a hole formed in an associated lens to connect the mount to the lens, which hole extends in the direction of the thickness of the lens; and a plastically deformable portion being provided adjacent said fixing part to allow adjustment of the remainder of the mount relative to the associated fixing part, and hence the lens;

wherein the part is held in the associated hole by an adhesive which has a volume prior to setting that is substantially the same as the volume thereof when set, wherein the adhesive acts as a buffer between the fixing part and the hole to substantially reduce or eliminate pressure around the assembly point of the fixing part and the lens.

* * * * *

UNITED STATES PATENT AND TRADEMARK OFFICE
CERTIFICATE OF CORRECTION

PATENT NO. : 7,717,553 B2  
APPLICATION NO. : 11/914677  
DATED : May 18, 2010  
INVENTOR(S) : Brian Lever It is certified that error appears in the above-identified patent and that said Letters Patent is hereby corrected as shown below:

Col. 10 Line 8 claim 39

An adhesive used for fixing a lens to a spectacle mount, the mount including a fixing part sized to fit into a hole formed in a lens to connect the mount to the lens, the part being which hole extends in the direction of the thickness of the lens held in the associated hole by the adhesive which has a volume prior to setting that is substantially the same as the volume thereof when set, wherein the adhesive acts as a buffer between the fixing part and the hole to substantially reduce or eliminate pressure around the assembly point of the fixing part and the lens.

Correct data below:

An adhesive used for fixing a lens to a spectacle mount, the mount including a fixing part sized to fit into a hole formed in a lens to connect the mount to the lens, the part being held in the associated hole by the adhesive which has a volume prior to setting that is substantially the same as the volume thereof when set, wherein the adhesive acts as a buffer between the fixing part and the hole to substantially reduce or eliminate pressure around the assembly point of the fixing part and the lens.

Signed and Sealed this

Third Day of August, 2010

David J. Kappos
*Director of the United States Patent and Trademark Office*